United States Patent [19]
Marin

[11] Patent Number: 5,182,066
[45] Date of Patent: Jan. 26, 1993

[54] EXTRUSION PROCESS AND APPARATUS FOR LOW CONTAMINANT CABLE INSULATION

[75] Inventor: Carlo Marin, Greenwood, S.C.

[73] Assignee: Pirelli Cable Corporation, Florham Park, N.J.

[21] Appl. No.: 800,645

[22] Filed: Nov. 27, 1991

[51] Int. Cl.⁵ .............................................. B29C 47/68
[52] U.S. Cl. .................................. 264/169; 264/40.1; 264/174; 264/211.23; 264/211.24; 425/113; 425/140; 425/197; 425/205; 425/382.3
[58] Field of Search ................... 264/169, 211.24, 174, 264/211.23, 236, 40.1, 40.2; 425/113, 203, 205, 197, 183, 185, 140, 382.3

[56] References Cited

U.S. PATENT DOCUMENTS

| | | | |
|---|---|---|---|
| 4,117,063 | 9/1978 | Voigt et al. | 264/174 |
| 4,285,648 | 8/1981 | Jocteur | 425/197 |
| 4,336,213 | 6/1982 | Fox | 264/40.1 |
| 4,489,029 | 12/1984 | Keogh et al. | 264/174 |
| 4,595,546 | 6/1986 | Wheeler, Jr. | 264/174 |
| 4,716,000 | 12/1987 | Kerschbaum et al. | 264/174 |

FOREIGN PATENT DOCUMENTS

| | | | |
|---|---|---|---|
| 2839094 | 3/1980 | Fed. Rep. of Germany | 264/174 |
| 53-40062 | 4/1978 | Japan | 264/40.2 |
| 58-142834 | 8/1983 | Japan | 264/236 |
| 61-211013 | 9/1986 | Japan | 425/203 |

*Primary Examiner*—Jeffrey Thurlow
*Attorney, Agent, or Firm*—Brooks Haidt Haffner & Delahunty

[57] ABSTRACT

Method and apparatus for applying a layer of insulation around an electrical cable core in which the contaminant size is not greater than about 200 microns. Unplasticized insulation material, such as polyethylene, is supplied to an extruder which forces the material through a filter which prevents the passage of contaminants having a size greater than about 200 microns and in which there is a pressure drop. The filtered material is delivered to a pump which increases the pressure thereon and forces it through a static mixer at the output of which the filtered material is delivered to the cross-head of extrusion apparatus which applies the filtered material to the cable core as it is advanced longitudinally. If the insulating material is to be cross-linked by a cross-linking agent, the agent is injected into the filtered material between the pump and the mixer.

16 Claims, 1 Drawing Sheet

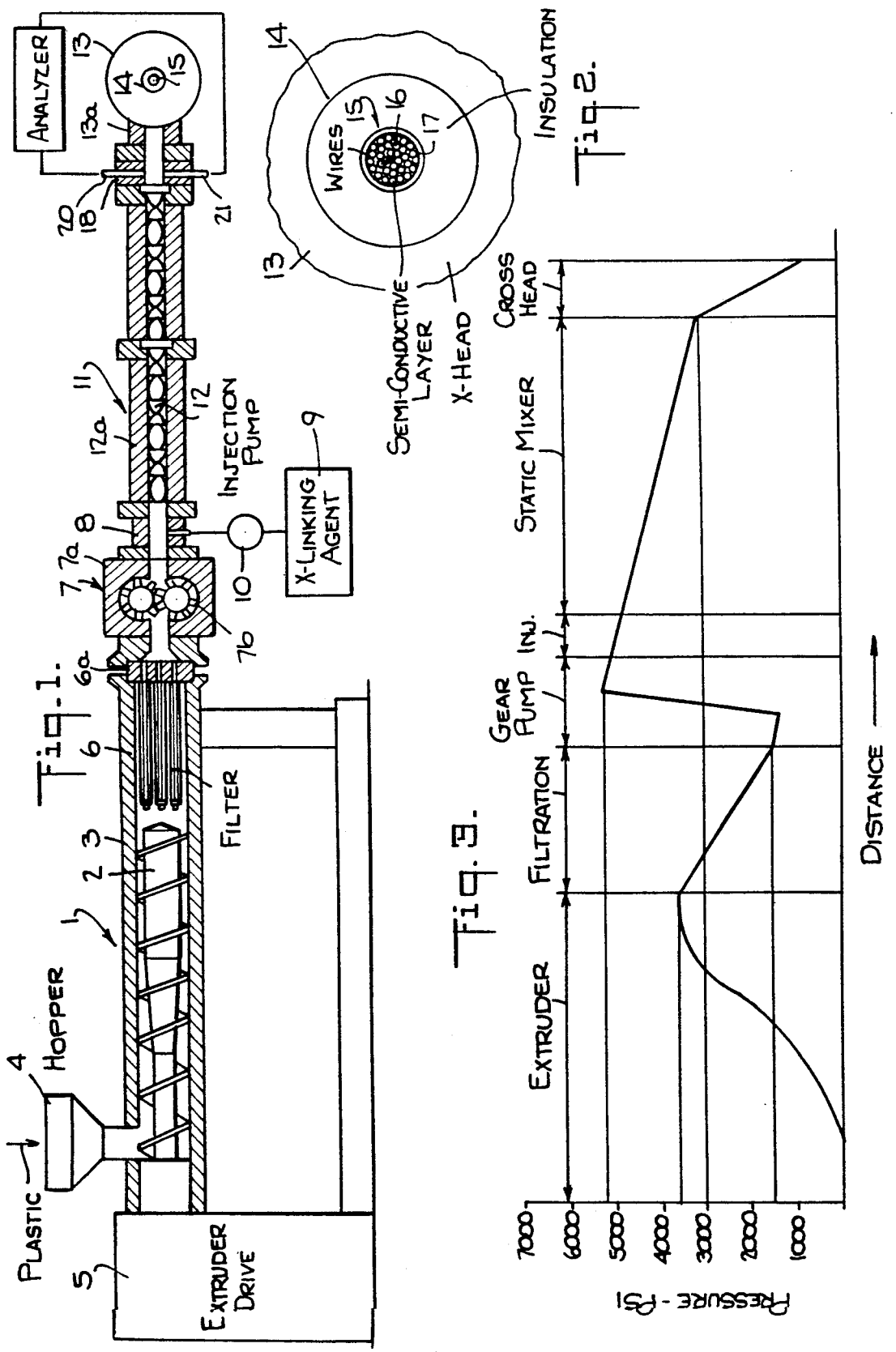

EXTRUSION PROCESS AND APPARATUS FOR LOW CONTAMINANT CABLE INSULATION

BACKGROUND OF THE INVENTION

The invention relates to a process and apparatus for extruding electrical insulation around the core of an electrical cable and particularly, for electrical cables to be used at relatively high voltages.

It is conventional in the art to extrude electrical insulation material, such as polyethylene and other plastics, over a core which includes at least one conductive wire. For high voltage power cables, the core usually includes a plurality of stranded wires encircled by a layer of semi-conductive material.

To obtain the highest dielectric strength, the insulation material should be free of contaminants, but in the preparation and handling of the material, contaminants inevitably become included with or within the material.

Manufacturers of electrical grade insulation material go to substantial lengths, such as filtering, washing, etc. of the material which is supplied to the cable manufacturer in the form of pellets, to reduce the contaminants to a low level. Such measures increase the cost of electrical grade insulation material as compared to the same material used for other purposes. However, in the handling and shipping of the pellets, from the material manufacturer to the cable manufacturer and in the handling and processing of the pellets at the cable manufacturer's plant, contaminants, such as dust, rust, etc. become mixed with the pellets.

In addition to the quantity of contaminants, which should be kept low, an important factor is the size of the contaminants. Thus, for high voltage, e.g. 150 kilovolts, the size of the contaminants should be kept below 50 microns. At lower voltages the size of the contaminants can be greater, but, preferably, they should not exceed about 200 microns.

It has heretofore been proposed that the insulation material be supplied to the cross-head which applies the insulation to the cable core by three extruders with a filter between the second extruder and the third final extruder to remove contaminants having a size greater than 50 microns. See the paper by J. Midoz presented at the International Conference on Polymer Insulated Power Cables, Mar. 5-10, 1984 and published in "Jicable" 1984. In the first extruder, a twin screw extruder, the insulation material, such as high density thermoplastic polyethylene or cross-linkable polyethylene, is plasticized with introduction of liquid additives. From the first extruder, the plasticized mixture is delivered directly to a pressurizing second screw extruder at the output of which there is a filter for removing contaminants larger than a predetermined size, e.g. 50 microns for cables to be used at 220 Kv. The filtered insulation material is supplied directly to a third screw extruder of long length which supplies the filtered insulation material directly to the cross-head for applying the insulation material to the cable core. If the insulation material is to be cross-linked by the addition of a cross-linking agent, such as peroxide, it is injected into the third extruder.

It will be noted that in such prior art system that three screw extruders were required, a plasticizing first extruder, a second extruder which will provide sufficient pressure to cause the insulation material to pass through the filter and a third extruder which provides sufficient pressure to supply the filtered insulation material to the cross-head and, if the cross-linking agent is injected at the third extruder, to mix the cross-linking agent with the filtered insulation material. Such extruders are relatively expensive, and the third extruder is not a good mixer and has output pressure fluctuations which cause undesirable thickness variations of the insulation on the cable core.

When particles larger than 50 microns are to be removed by the filter, relatively high pressures are required at the filter input, and if a cross-linking agent is used, the cross-linking agent should not be added to the insulation material upstream of the filter to avoid cross-linking during the filtering. Also, there is a large pressure drop across the filter.

BRIEF SUMMARY OF THE INVENTION

To provide improved apparatus which will reduce the size and quantity of the contaminants in the insulation material applied to an electrical cable core by extrusion while keeping the pressures necessary within practical limits, the pellets of the insulation material are worked under heat and pressure in an extruder, such as a screw extruder, and from which the insulation material is supplied directly to and passed through a filter which removes particles of a size greater than the desired size, e.g. about 200 microns or less. The filtered insulation material is received by a pump, such as a gear pump, in tandem with the filter, and the pump supplies the filtered insulation material to a mixer, such as a static mixer, from which the material exits into the conventional cross-head of a conventional extruder which applies the material to the cable core. If a cross-linking agent is used, the cross-linking agent is injected intermediate the pump and the mixer. In this way, excessive pressure on the material is not required, contaminants above the desired size are eliminated and cross-linking of the material does not commence significantly until it is applied to the cable core.

Preferably, in order to prevent the pick-up of contaminants during the passage of the filtered insulating material from the filter outlet to the cross-head, the filter outlet, the pump, the mixer and the cross-head are provided with interconnected enclosures for excluding such contaminants.

BRIEF DESCRIPTION OF THE DRAWINGS

Other objects and advantages of the present invention will be apparent from the following detailed description of the presently preferred embodiments thereof, which description should be considered in conjunction with the accompanying drawings in which:

FIG. 1 is a diagrammatic, side elevation view, partly in cross-section, of the preferred embodiment of the invention;

FIG. 2 is an enlarged view of a portion of the embodiment shown in FIG. 1; and

FIG. 3 is a graph illustrating the pressures employed in the embodiment of FIG. 1.

DETAILED DESCRIPTION OF PREFERRED EMBODIMENTS OF THE INVENTION

The apparatus of the invention can be used either with cross-linkable or non-cross-linkable insulation material which preferably is a polymeric compound, such as a polyethylene compound. If the insulation is to be cross-linked, it can be cross-linked by any conventional method, such as by the addition of a cross-linking agent downstream of the filter and suitable treatment of the insulation after application thereof to the cable core, by subjecting the insulation to radiation after it is applied to the core or by introducing additives into the insulation material upstream of the filter and exposing the insulation on the core to moisture. The preferred apparatus of the invention, in which a cross-linking agent is injected downstream of the filter, will be described herein.

In the embodiment shown in FIG. 1, there is a screw extruder 1 having a screw 2 within an enclosing barrel 3 to which the insulation material is supplied by way of a hopper 4. The screw 2 is rotated by a conventional drive 5, and the insulation material is heated within the barrel 3 by conventional means. The heated insulation material in a plastic state is forced by the screw 2 through a filter 6 which removes particles above a predetermined size, e.g. 200 microns for lower voltage cables. For high voltage cables operating in the range from 46 kilovolts to 500 kilovolts, the filter 6 preferably removes particles in the range from three to 100 microns. Although other filters can be used, a known type of filter which can be used is a filter known as "candle" filter and which is sold by Memtec Fluid Dynamics (formerly known as Brunswick Technetics) having an address at 1750 Memtec Drive, Deland, Fla. Such filters can be designed to remove particles having a size of three microns or greater, or a selected size greater than three microns, and have been used to filter particles from plastic materials used for textile fibers and for the production of films.

From the filter 6, the filtered insulation material is supplied to a pump 7 which preferably, is a gear pump of the type sold by Luwa Corporation, Fluid Systems Division, P.O. Box 16348, Charlotte, N.C., for the extrusion of polymers. The pump has a housing 7a, enclosing gears 7b, secured at one end in a conventional manner, in fluid and pressure tight relation to the output 6a of the filter 6.

From the pump 7, the filtered insulation material passes through a short section 8 where a cross-linking agent, of a type well known for the cross-linking of the material used, e.g. peroxide for polyethylene, is supplied from a source 9 thereof to an injection pump 10 and hence, into the section 8. The section 8 is secured at one end, in a conventional manner, in fluid and pressure tight relation to the housing 7a. If the insulation material is not to be cross-linked, injection of the cross-linking agent and the section 8 can be omitted.

From the section 8, the insulating material with the added cross-linking agent enters under pressure into a heated mixer 11 where the cross-linking agent is mixed with the insulation material. Preferably, the mixer 11 is of the type sold by Chemineer, Inc., a subsidiary of Clevepak Corporation, having an address at 166 Elm Street, North Andover, Mass. 01845. Such mixer has a non-rotatable, screw-like element 12 which mixes the insulating material and the cross-linking agent by flow division. The element 12 is enclosed by a tube 12a which is secured at one end, in a conventional manner, in fluid and pressure tight relation to the section 8.

While the mixer 11 could be replaced by a conventional screw extruder like the screw extruder 1, the static mixer 11 is preferred because it eliminates the need for a mechanical drive and it provides better mixing than a screw extruder.

When a static mixer is employed, a pump 7 is necessary to push the filtered insulation material through the mixer and to provide the necessary pressure on the insulation material at the input of the cross-head 13. Furthermore, a gear pump 7 of the type described in preferred for applying such pressure because the pressure fluctuations are smaller than the pressure fluctuations of a screw extruder, such fluctuations causing undesirable variations in the thickness of the applied insulation 14. While such pump 7 provides the necessary pressure, it does not provide significant mixing of the material passing therethrough.

The heated and filtered insulating material mixed with the cross-linking agent and in a plastic state leaves the output of the mixer 11 under pressure and is applied to a conventional cross-head 13 of a conventional extruder for the extrusion of a layer of insulation 14 over a cable core 15 which can be a plurality of stranded conductive wires 16 encircled by a thin layer 17 of semi-conductive material, e.g. a layer of plastic containing carbon (see FIGS. 1 and 2).

Although not essential, preferably, the output end of the mixer 11 is connected to the input 13a of the cross-head through a section 18 provided for monitoring of the size of the contaminants in the filtered insulation material cross-linking agent mixture. The section 18 is connected at one end in a fluid and pressure tight relation to the output of the mixer 11 and at its opposite end, in a fluid and pressure tight relation to the input 13a of the cross-head 13 in a conventional manner.

The monitoring equipment can include an analyzer 19 of the type known as a Continuous On Line Analyzer and sold by Flow Vision Inc., Clifton, N.J., which is connected to probes 20 and 21. Such equipment can detect particles in the 5–1000 micron range.

The pressure required to deliver the insulating material from the hopper 4 to the cross-head 13 would be excessive from a practical standpoint. FIG. 3 illustrates graphically typical pressure requirements for a system including a filter 6. Thus, for polyethylene insulation, a typical input pressure for the filter 6 would be about 3600 p.s.i., and the pressure at the output of the filter would be about 1500 p.s.i., a pressure loss of about 2100 p.s.i. The pressure drop across the mixer 11 is about 2000 p.s.i. However, the pressure at the cross-head 13 should be about 3000 p.s.i. which means that without the pump 7, the extruder 1 would have to provide a pressure of about 7100 p.s.i. (3000+2000+2100) which is impractical with present day extruders. For these reasons, the preferred apparatus of the invention employs a pair of pressure applying devices, one before the filter 6 and one after the filter 6, and a gear pump 7 as the pressure applying device intermediate the filter 6 and the mixer 11.

I claim:

1. The method of providing a layer of insulation with contaminants of a size of not more than about 200 microns on an electrical cable core and comprising at least a conductor which is long relative to its thickness, said method comprising:

supplying insulation material under pressure to a filter which prevents the passage therethrough of particles greater than about 200 microns and causing said insulation material to pass through and exit from said filter as filtered insulation material;

as said filtered insulation material exits from said filter, supplying said filtered insulation to a pump which increases the pressure applied to said filtered insulation material which exits from said pump;

as said filtered insulation material exits from said pump, supplying said filtered insulation material to a mixing means, said mixing means having an outlet from which said filtered insulation exits;

as said filtered insulation material exits from said outlet of said mixing means, supplying said filtered insulation material to an extruder; and at said extruder, extruding said filtered insulation material around the cable core as it is advanced in the direction of its length.

2. The method as set forth in claim 1 wherein said filter, said pump, said mixing means and said extrusion apparatus are interconnected and are provided with enclosures to prevent contaminants from reaching said filtered insulation material during the passage thereof from said filter to said extrusion apparatus.

3. The method as set forth in claim 1 wherein a cross-linking agent is supplied to said filtered insulation material after it exits from said filter and prior to exiting from said mixing means.

4. The method as set forth in claim 3 wherein said cross-linking agent is injected into said filtered insulation material intermediate said pump and said mixing means.

5. The method as set forth in claim 1 wherein said pump is a gear pump and said mixing means is a static mixer.

6. The method as set forth in claim 5 wherein said filter prevents the passage therethrough of particles greater than about 50 microns.

7. Apparatus for providing a layer of insulation with a contaminant size of not more than about 200 microns on an electrical cable core which is long relative to its thickness and comprising at least a conductor, said apparatus comprising:

an extruder for plasticizing and applying pressure to insulation material which is to form the layer of insulation, said extruder having an input for receiving said insulation material and an output, means for supplying said insulation material to said input of said extruder;

a filter which prevents the passage therethrough of contaminants of a size greater than about 200 microns, said filter having an input connected to said output of said extruder and an output from which filtered insulation material exits;

a pump having an input connected to said output of said filter for applying pressure to said filtered insulation material, said pump having an output from which said filtered material exits under pressure;

mixing means having an input connected to said output of said pump and an output from which said filtered insulation material exits after mixing by said mixing means;

a further extruder having an input connected to said output of said mixing means and means for receiving a cable core and applying said filtered insulation around the cable core as the latter is advanced through said extrusion apparatus.

8. Apparatus as set forth in claim 7 wherein said pump is a gear pump for applying a pressure to said filtered insulation material in excess of the pressure applied thereto at said input of said pump and said mixing means is a static mixer.

9. Apparatus as set forth in claim 8 wherein said means for supplying said insulation material to said input of said extruder is means for supplying said insulation material in unplasticized form.

10. Apparatus as set forth in claim 7 further comprising injection means for injecting a cross-linking agent into said filtered insulation material intermediate said output of said filter and said output of said mixing means.

11. Apparatus as set forth in claim 10 wherein said injection means is connected intermediate said output of said pump and said input of said mixing means for injecting said cross-linking agent into said filtered insulation material prior to entry thereof into said mixing means.

12. Apparatus as set forth in claim 7 wherein said extruder requires a predetermined pressure on said filtered insulation material for proper operation, wherein each of said filter and said mixing means causes a decrease in the pressure on said filtered insulation material as compared to the pressure applied thereto as it enters, respectively, said filter and said mixing means, wherein the pressure applied to said filtered insulation material at said output of said filter is less than said predetermined pressure and wherein said pump has a pressure applying capacity sufficient to cause said filtered insulation material to have said predetermined pressure applied thereto as it exits from said mixing means.

13. Apparatus as set forth in claim 7 further comprising contaminant size monitoring means connected intermediate said output of said mixing means and said input of said further extruder.

14. Apparatus as set forth in claim 7 wherein said filter, said pump, said mixing means and said input to said extrusion apparatus are provided with enclosures to prevent contaminants from reaching said filtered insulation material during the passage thereof from said filter to said input of said extrusion apparatus.

15. Method as set forth in claim 1 wherein said layer of insulation has contaminants not greater than 3 microns and said filter prevents the passage therethrough of particles greater than 3 microns.

16. Apparatus as set forth in claim 7 wherein said layer of insulation has contaminants not greater than 3 microns and said filter prevents the passage therethrough of particles greater than 3 microns.

* * * * *